United States Patent
Harris et al.

(10) Patent No.: US 6,744,773 B1
(45) Date of Patent: Jun. 1, 2004

(54) METHOD AND APPARATUS FOR MANAGING INTER-DOMAIN ADDRESSES BETWEEN A PLURALITY OF DOMAINS

(75) Inventors: Michael Joseph Harris, Toms River, NJ (US); William Kovar, Jackson, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/133,831

(22) Filed: Aug. 13, 1998

(51) Int. Cl.[7] .................... H04L 12/66; H04L 12/28; G06F 9/00; H04M 7/00
(52) U.S. Cl. ............... 370/401; 370/352; 370/398; 379/220.01; 379/908; 709/311; 709/328
(58) Field of Search ............... 370/352–353, 370/356, 360, 398, 395.5, 401, 392, 389, 397, 399, 466, 467, 471, 474, 218; 709/249, 310, 311, 315, 331–332, 328, 227, 238, 244; 379/211.01, 212.01, 220.01, 265.02, 908, 914, 266

(56) References Cited

U.S. PATENT DOCUMENTS

| | | | | |
|---|---|---|---|---|
| 5,590,118 A | * | 12/1996 | Nederlof ................... | 370/218 |
| 6,195,091 B1 | * | 2/2001 | Harple et al. ............. | 345/751 |
| 6,295,354 B1 | * | 9/2001 | Dezonno ................... | 379/266 |
| 6,421,714 B1 | * | 7/2002 | Rai et al. ................. | 709/217 |
| 6,463,078 B1 | * | 10/2002 | Engstrom et al. ......... | 370/466 |

OTHER PUBLICATIONS

The Java Telephony API: An Overview, downloaded from www.java.sun.com/products/jtapi, Version 1.2 (Oct. 1997).

\* cited by examiner

*Primary Examiner*—Dang Ton
*Assistant Examiner*—Inder Pal Mehra
(74) *Attorney, Agent, or Firm*—Ryan, Mason & Lewis, LLP

(57) ABSTRACT

A multi-domain telephony application programming interface is disclosed for managing a multimedia call across a plurality of domains. Advanced addressing techniques are utilized to support a media independent call control model across multiple communication domains in a consistent and integrated manner. In an illustrative embodiment, the multi-domain telephony application programming interface is based on the Java Telephony API (JTAPI). The multi-domain telephony application programming interface recognizes a call between two domains as one call on both systems, and presents the calls together as a single transaction to a user application. The multi-domain telephony application programming interface identifies and manages a set of inter-domain addresses that are the egress and access points between two domains, so that calls can traverse between them. Inter-domain addresses create a standard way to add or drop any endpoint in a call, regardless of which domain the originating or terminating endpoint is in, by configuring and managing the available gateway paths between domains in a consistent manner. Inter-domain addresses are uniquely addressable within the multi-domain telephony application programming interface domain. Inter-domain addresses can be directional with a source IDA and a destination IDA comprising an IDA pair.

18 Claims, 3 Drawing Sheets

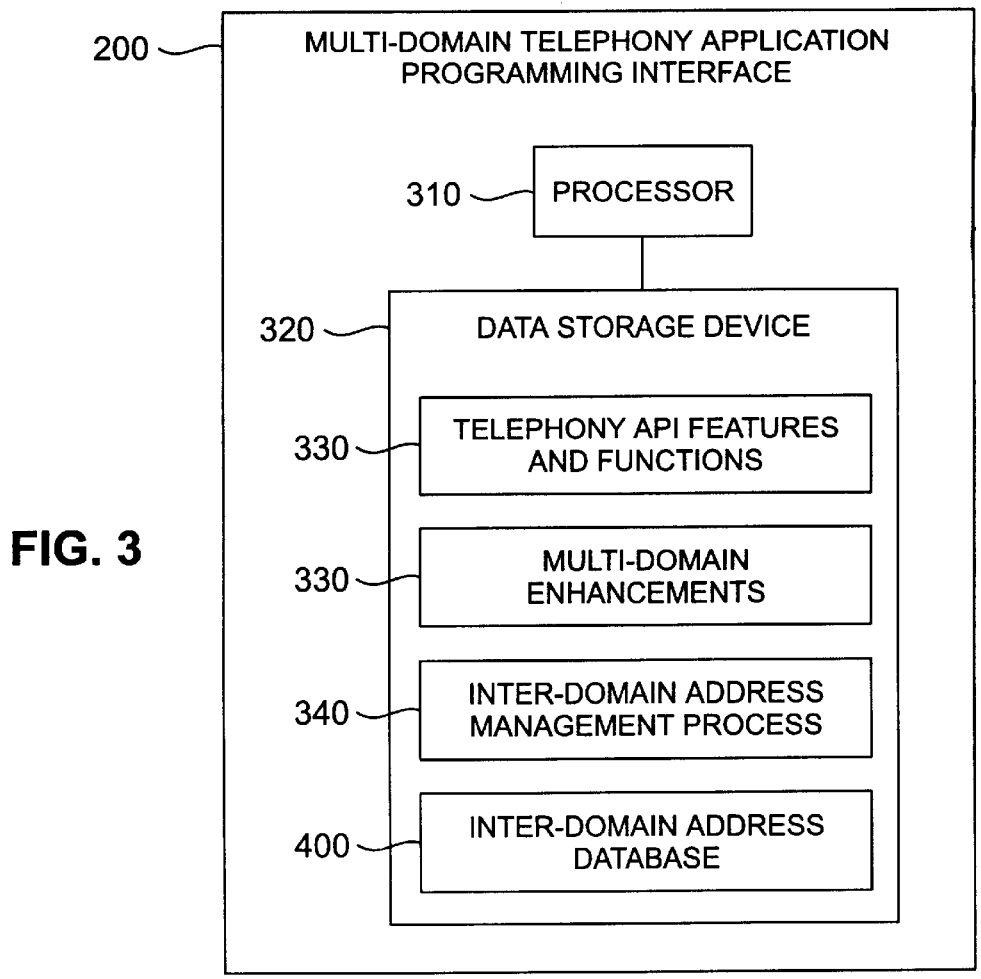

METHOD AND APPARATUS FOR MANAGING INTER-DOMAIN ADDRESSES BETWEEN A PLURALITY OF DOMAINS

FIELD OF THE INVENTION

The present invention relates to a network communication system, and more particularly, to a method and apparatus for managing a multimedia call across a plurality of domains.

BACKGROUND OF THE INVENTION

With the emergence of communications networks capable of carrying both voice and data traffic, a number of new multimedia services are increasingly being delivered together with more traditional telephony products. For example, the use of broadband networks, such as asynchronous transfer mode (ATM) networks, for the transfer of multimedia information, such as video, voice and data, has become increasingly popular due to the high data rate and flexibility associated with such networks. ATM and other broadband networks have been embraced by the computer and telecommunication industries for networking existing and future multimedia applications, such as video conferencing, multimedia messaging, video-on-demand, and telephone applications.

In addition, in the end-to-end path of multimedia sessions, a number of heterogeneous network technologies or "domains," such as switches with different switch fabrics or diverse transport links, may be involved. For example, a number of domains are traversed when a private branch exchange (PBX)-based subscriber desires to access multimedia information available over an ATM network from an interactive voice response unit (IVRU), such as the Conversant™ IVRU and media player, commercially available from Lucent Technologies Inc., of Murray Hill, N.J. The PBX switch, ATM network and IVRU are each separate domains, having unique protocols and addressing mechanisms.

Currently, multimedia information may be transmitted across ATM and other networks to an end user by means of an integrated transport protocol, whereby the various monomedia components within the composite multimedia signal are encoded and transported together. The call control component of multimedia calls is responsible for managing, maintaining and manipulating the logical state of all calls within a given switching domain, such as a modem or a private branch exchange switch. The call control component maintains knowledge of all active calls within a particular switching domain. There is currently little, if any, integration, however, of the various call control components of each domain in the end-to-end path of a multimedia session. Within each domain, application programming interfaces generally manipulate call control information to allow the origination and termination of calls and to monitor or change the state of existing calls. Each domain has a core capability to provide call control. A major difficulty arises when attempting to integrate two domains that have their own customized call control.

A need exists for a cross-platform call control integration strategy that allows a single call object to manage a multimedia call across multiple. domains. While current computer telephony integration (CTI) technologies allow first or third party call control for calls that exist within the domain of a given switch, they do not allow a single call control object to be connected to endpoints in two different domains. Where a call spans two switches, with each end of the call terminating on a different switch, or spans multiple media domains, very little call control capabilities currently exist. Although it would be desirable to treat calls that span multiple physical domains or multiple media domains or both as single calls, such calls are currently treated as multiple separate calls for call control purposes.

Currently, telephony application programming interfaces (APIs) do not allow a single call control object to be connected to endpoints in two different domains. For example, a telephone call between a voice over IP (VoIP) party and a PBX party spans two domains. Thus, this single call must be modeled and programmed as two separate calls, one in each domain, using currently available telephony APIs. If an application does require a single-call view of the call, the application must integrate the call control objects outside of the capabilities of the API.

The Java Telephony API (JTAPI), for example, commercially available from JavaSoft, Sun Microsystems, Inc., of Mountain View, Calif. supports multimedia, single domain calls. The Java Telephony API (JTAPI) is a portable, object-oriented application programming interface for Java-based computer-telephony applications. JTAPI was designed by a consortium of industry companies, including Lucent Technologies Inc., Dialogic, IBM, Intel, Nortel, Novell, Siemens, and Sun Microsystems. The JTAPI specification is actually a set of specifications for computer-telephony integrated call control. The "core" API within JTAPI provides the basic call model and basic telephony features, such as the placement and receipt of telephone calls. The "core" API is surrounded by additional APIs that provide functionality for specific telephony domains. Although JTAPI supports multimedia, single domain calls, JTAPI, does not handle multiple domain calls.

SUMMARY OF THE INVENTION

Generally, a multi-domain telephony application programming interface (API) is disclosed for managing a multimedia call across a plurality of domains. The multi-domain telephony application programming interface integrates the different call control and media protocols of various, domains. The multi-domain telephony application programming interface uses advanced addressing techniques to support a media independent call control model across multiple communication domains in a consistent and integrated manner. The call control capabilities of existing telephony application programming interfaces are normalized across multiple switching and media domains so that a logical call can span multiple domains. In the illustrative embodiment, the multi-domain telephony application programming interface is based on the Java Telephony API (JTAPI).

The multi-domain telephony application programming interface hides the complexity of mapping call identifiers of separate domains together and also provides a consistent way to support calls that span multiple domains. The multi-domain telephony application programming interface provides a cross-product solution that merges the call control capabilities of existing domain-specific interfaces.

The multi-domain telephony application programming interface recognizes a call between two domains as one call on both systems, and presents the calls together as a single transaction to a user application. The multi-domain telephony application programming interface implements a set of conventional API features and functions as well as a set of multi-domain enhancements in accordance with the present invention.

The multi-domain telephony application programming interface identifies and manages a set of inter-domain addresses (IDAs) that are the egress and access points between two domains, so that calls can traverse between them. According to one aspect of the invention, inter-domain addresses create a standard way to add or drop any endpoint in a call, regardless of which domain the originating or terminating endpoint is in, by configuring and managing the available gateway paths between domains in a consistent manner. The inter-domain address acts as a path between two different domains and hides the complexity of the various links included in the end-to-end path. Inter-domain addresses are uniquely addressable within the multi-domain telephony application programming interface domain. In one preferred implementation, inter-domain addresses are directional with a source IDA and a destination IDA comprising an IDA pair. According to a further aspect of the invention, each IDA pair preferably supports the same media types at both ends of the gateway IDA path.

The present invention allows a programmer to create third party call control applications that are media independent and support end-to-end call tracking through a single global call identifier.

A more complete understanding of the present invention, as well as further features and advantages of the present invention, will be obtained by reference to the following detailed description and drawings.

BRIEF DESCRIPTION OF THE DRAWINGS

FIG. 3 is a schematic block diagram of the multi-domain telephony application programming interface of FIG. 2; and FIG. 4 illustrates a sample table from the inter-domain address database of FIG. 3.

DETAILED DESCRIPTION

Figure 1:
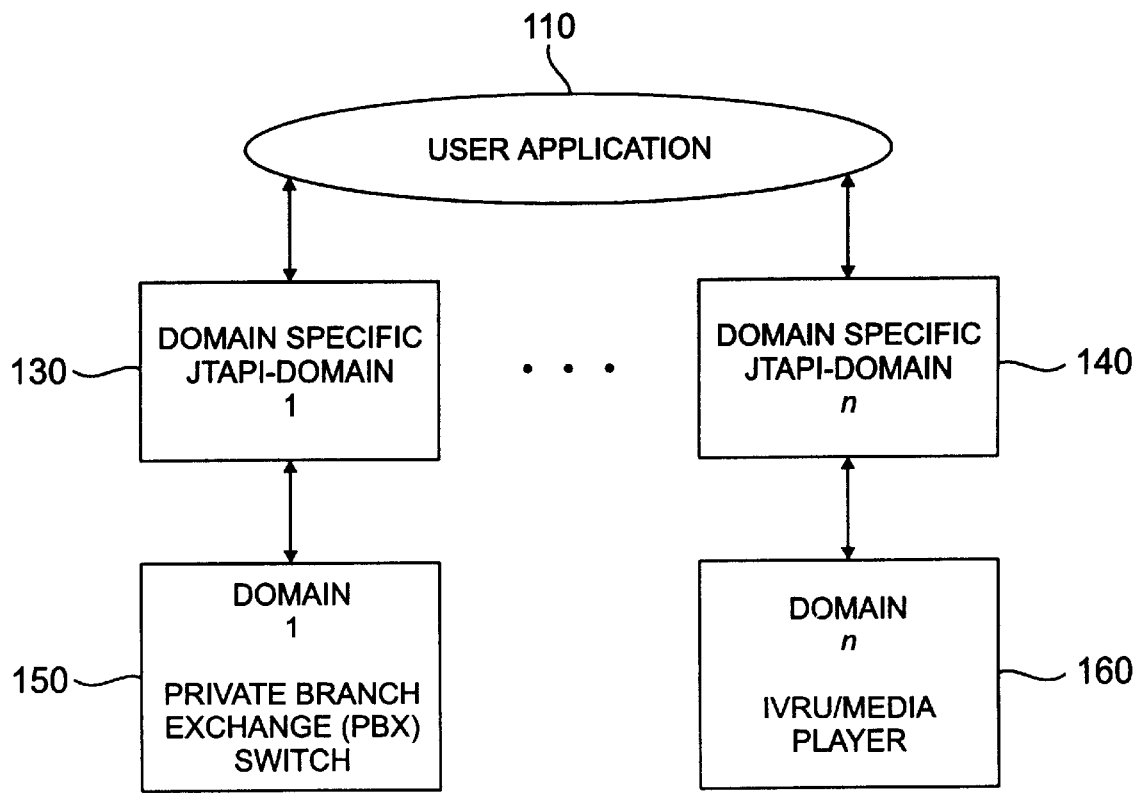
FIG. 1 is a schematic block diagram illustrating a set of conventional vertical domain-specific solutions that each provide access to a single domain.

FIG. 1 shows a user application 110 having a separate application programming interface 130, 140 to a corresponding domain 150, 160. As shown in FIG. 1, conventional telephony application programming interfaces, such as the JTAPI interface, are generally based on access to a single domain. For example, Lucent Technologies Inc. currently provides a Telephony Services API (TSAPI) to JTAPI translation layer to allow TSAPI-enabled devices, including the Definity™ PBX switch 150, to be accessible to JTAPI programmers. In addition, Lucent Technologies Inc. currently provides an IRAPI to JTAPI translation layer to allow IRAPI-enabled devices, including the Conversant™ IVRU and media player 160, to be accessible to JTAPI programmers. Thus, if the application programming interface 130 was embodied as the JTAPI on TSAPI interface, the interface 130 only manipulates calls within the PBX domain exposed by the TSAPI service provider. Likewise, if the application programming interface 140 was embodied as the JTAPI on IRAPI interface, the interface 140 only manipulates calls/media sessions within the Conversant domain exposed by the IRAPI service provider. If an application required a single-call view of a call between the Definity™ PBX 150 and Conversant™ IVR 160, the application must explicitly manage the integration between the two interfaces 130, 140.

As shown in FIG. 1, as the number of vertical domain-specific solutions increases with the addition of videoconferencing, data collaboration, messaging and other existing and future multimedia applications, the number of unavoidable sideways integration paths increases. This sideways integration needs to physically exist in the form of some physical connection between different domains 150, 160, but also needs to be exposed in a software form so that application development environments can manipulate them.

MULTI-DOMAIN TELEPHONY APPLICATION PROGRAMMING INTERFACE

Figure 2:
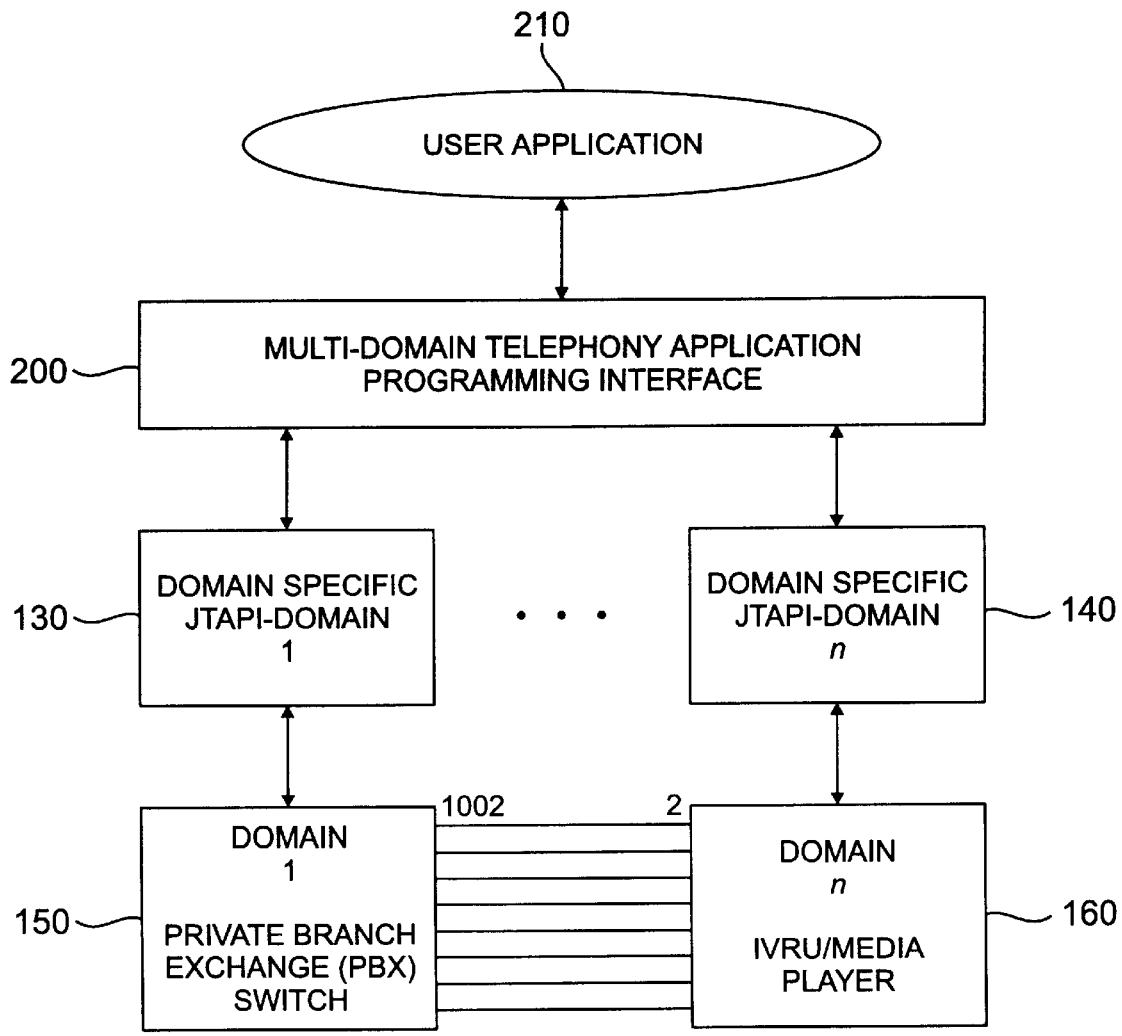
FIG. 2 illustrates an integrated multi-domain telephony application programming interface that provides access to multiple domains, in accordance with the present invention.

FIG. 2 shows an integrated user application 210 written on top of a multi-domain telephony application programming interface 200, in accordance with the present invention. As discussed further below, the multi-domain telephony application programming interface 200 hides the complexity of mapping call identifiers of separate domains together and also provides a consistent way to support calls that span multiple domains. The multi-domain telephony application programming interface 200 integrates the call control layer. Thus, the multi-domain telephony application programming interface 200 provides a cross-product solution that merges the call control capabilities of the interface 130 with the call control capabilities of the interface 140.

According to a feature of the present invention, the multi-domain telephony application programming interface 200, discussed below in conjunction with FIG. 3, recognizes a call between two domains 150, 160 as one call on both systems, and presents the calls together as a single transaction to the user application 210. As shown in FIG. 3, the multi-domain telephony application programming interface 200 may be embodied as a conventional telephony application programming interface, such as the JTAPI interface, as modified herein to integrate the different call control and media protocols of various domains, 150, 160, such as the Definity™ private branch exchange switch and Conversant™ IVR. Thus, the multi-domain telephony application programming interface 200 includes a processor 310 to implement a set of conventional API features and functions 320, as well as a set of multi-domain enhancements 330 in accordance with the present invention, discussed in the following section.

MULTI-DOMAIN ENHANCEMENTS

In order to integrate the different call control and media protocols of such various domains, the multi-domain telephony application programming interface 200 must extract the call control functionality from the individual protocols of each domain, and map them to JTAPI call and connection objects, that allow a media independent view of call control. In addition, the multi-domain telephony application programming interface 200 must extract the device or endpoint specific functionality from each of the individual protocols and map them to JTAPI terminal and terminal connection objects. The device or endpoint specific functionality includes call setup and tear down parameters, bandwidth and quality of service requirements, and the logical modeling of the endpoints themselves, such as telephones, video cameras, and personal computers (PCs) as telephones. The terminal and terminal connection objects allow a media dependent view of call control from the perspective of the capabilities of the endpoint and the media domain used to connect to the endpoint.

In addition, the multi-domain telephony application programming interface 200 must extend the capabilities of the JTAPI address object to support multi-domain addressing. In a multi-domain address namespace, additional information is necessary to fully qualify the media type and media domain characteristics of a particular logical address. In a multi-domain environment, the name value can be any string value, such as "800-555-1212," "192.11.123.77," or "bkovar.voicemail@lucent.com." Furthermore, in a multi-domain environment, the namespace of all addresses is the union of addresses managed by each of the domains. Thus, to properly resolve these addresses, additional characteristics must be maintained for addresses. For example, since conventional telephony application programming interfaces, such as JTAPI, generally assume that addresses are local to a single domain, it is necessary to identify the domain an address belongs to in an aggregated multi-domain environment. In addition, addresses in a particular domain may imply a specific media type or types.

As discussed further below in a section entitled INTER-DOMAIN ADDRESSES, when integrating two or more domains, so that calls can traverse between them, it is necessary to identify and manage a set of inter-domain addresses that are the egress and access points between the two domains. According to one feature of the present invention, inter-domain addresses create a standard way to add or drop any endpoint in a call, regardless of which domain the originating or terminating endpoint is in, by configuring and managing the available gateway paths between domains in a consistent manner. Thus, as shown in FIG. 3, the multi-domain telephony application programming interface 200 also includes an inter-domain address management process 340 and an inter-domain address database 400, discussed below in conjunction with FIG. 4, to record the egress and access points between two domains. The interdomain address management process 340 identifies and manages a set of inter-domain addresses that are the egress and access points between two domains.

Finally, the multi-domain telephony application programming interface 200 must provide a singular global call identifier that is unique within the namespace of a single JTAPI call server, by hiding the underlying media domain's call identifier and mapping the underlying call identifier to a globally known call identifier. The global call identifier is preferably available to all participants of the call from the time the call comes into existence until the call is terminated. This "cradle to grave" existence is possible because the JTAPI call object, in the illustrative JTAPI implementation, is always part of the call. The global call identifier is created by the multi-domain telephony application programming interface 200 whenever a new call is initiated within the domain of the multi-domain telephony application programming interface 200. If the multi-domain telephony application programming interface 200 is built upon existing domain-specific telephony application programming interfaces 130, 140, that have their own call identifier semantics, a mapping is done by the multi-domain telephony application programming interface 200 to maintain the underlying relationship.

INTER-DOMAIN ADDRESSES

As previously indicated, the multi-domain telephony application programming interface 200 identifies and manages a set of inter-domain addresses that are the egress and access points between two domains, so that calls can traverse between them. For example if the domain 150 shown in FIG. 2 is embodied as a private branch exchange and the domain 160 is embodied as an IVR/media player, the multi-domain telephony application programming interface 200 must map the set of addresses (ports) on the PBX 150 to a set of addresses (channels) on the IVR/media player 160 to provide IVR services to existing PBX calls. As shown in FIG. 4, the address 1002 on the PBX 150 is mapped to address 2 on the IVR/media player 160.

Generally, inter-domain addresses are pre-administered during system startup and are uniquely addressable within the multi-domain telephony application programming interface 200 domain. In one preferred implementation, inter-domain addresses are directional with a source IDA and a destination IDA comprising an IDA pair. Thus, an IDA pair does not require bidirectionality. For example, given PBX address A and a voice over IP (VoIP) address B, as an IDA pair, there is no guarantee that the path AB taken by a call to traverse from the PBX domain to the VoIP domain also supports the path BA to traverse from the VoIP domain to the PBX domain. According to a further feature of the invention, each IDA pair preferably supports the same media type at both ends of the gateway IDA path.

As previously indicated, the multi-domain telephony application programming interface 200 maintains an inter-domain address database 400, shown in FIG. 4, to record the egress and access points between two domains. As shown in FIG. 4, the inter-domain address database 400 maintains a plurality of records, such as records 405-410, each corresponding to a different IDA pair. For each IDA pair, the inter-domain address database 400 indicates the source IDA and the destination IDA comprising the IDA pair. Thus, in the illustrative implementation, an IDA indicates the corresponding domain, as well as the address (port or channel). The inter-domain address database 400 may also optionally include other information about the source or destination IDAs (or both), such as the media type and/or media domain of the source and destination IDAs.

USER APPLICATION AS OBSERVER

If an application, such as user application 210 (FIG. 2), is embodied as an observer of phone activity and events, and a call is initiated by a user assigned to extension (address) 1000 on the private branch exchange switch 150, by dialing address. 1002, the call is received by the IVRU/media player 160 as an incoming call on channel 2. The user application 210 initially detects that extension 1000 has gone "off-hook" and has dialed extension. 1002. In addition, the multi-domain telephony application programming interface 200 will look-up the inter-domain address PBX/1002 in the inter-domain address database 400 and determine that address 1002 provides a link to the WVR domain 160. Thereafter, the multi-domain telephony application programming interface 200 notifies the user application 210 that IDA 1002 terminates at channel 2 on the IVRU/media player 160. Thus, the multi-domain telephony application programming interface 200 identifies the endpoints and aggregates the individual view of the call in each domain into a single call.

USER APPLICATION AS REQUESTER

If an application, such as user application 210 (FIG. 2), is embodied as a requester of phone activity, and initiates a call from extension (address) 1000 on the private branch exchange switch 150 to channel 2 on the IVRU/media player 160. The multi-domain telephony application programming interface 200 detects the request and recognizes that two domains are involved. The multi-domain telephony application programming interface 200 determines that address 1002 must be called on the private branch exchange switch 150 to complete the request to connect channel 2 on the IVRU 160. Thus, the multi-domain telephony application programming interface 200 splits the single multi-domain request into its constituent parts in each domain, while still presenting a single call to the user application 210.

It is to be understood that the embodiments and variations shown and described herein are merely illustrative of the principles of this invention and that various modifications may be implemented by those skilled in the art without departing from the scope and spirit of the invention.

We claim:

1. A method for integrating the call control features of a first and second communication domain, said first communication domain having an egress point and said second communication domain having an access point, said egress and access points interconnected by a communication path, said method comprising the steps of:
assigning an inter-domain address to said communication path, wherein said inter-domain address comprises an address associated with said egress point and an address associated with said access point; and
determining said access point to said second communication domain using said inter-domain address following a call in said first domain to said egress point.

2. The method according to claim 1, wherein said inter-domain address is directional with a source IDA associated with said egress point and a destination IDA associated with said access point.

3. The method according to claim 1, wherein said inter-domain address is uniquely identifiable within said first and second communication domains.

4. The method according to claim 1, wherein said communication path supports multimedia communications and said method provides a media independent call control model.

5. The method according to claim 1, wherein said inter-domain address includes a media type and a media domain for each of said egress point and said access point.

6. A method for integrating the call control features of a first and second communication domain, said first communication domain having an egress point and said second communication domain having an access point, said egress and access points interconnected by a communication path, said method comprising the steps of:
assigning an inter-domain address to said communication path, wherein said inter-domain address comprises an address associated with said egress point and an address associated with said access point; and
identifying a call between said first and second communication domains as a single call using said inter-domain address.

7. The method according to claim 6, further comprising the step of presenting said call between said first and second communication domains as a single call to a user application.

8. The method according to claim 6, wherein said inter-domain address comprises an address associated with said egress point and an address associated with said access point.

9. The method according to claim 6, wherein said inter-domain address (IDA) is directional with a source IDA associated with said egress point and a destination IDA associated with said access point.

10. The method according to claim 6, wherein said inter-domain address is uniquely identifiable within said first and second communication domains.

11. The method according to claim 6, wherein said communication path supports multimedia communications and said method provides a media independent call control model.

12. The method according to claim 6, wherein said inter-domain address includes a media type and a media domain for each of said egress point and said access point.

13. A system for integrating the call control features of a first and second communication domain, said first communication domain having an egress point and said second communication domain having an access point, said egress and access points interconnected by a communication path, said system comprising:
a memory for storing an inter-domain address assigned to said communication path, wherein said inter-domain address comprises an address associated with said egress point and an address associated with said access point; and
a processor for determining said access point to said second communication domain using said inter-domain address following a call in said first communication domain to said egress point.

14. The system according to claim 13, wherein said inter-domain address comprises an address associated with said egress point and an address associated with said access point.

15. The system according to claim 13, wherein said inter-domain address (IDA) is directional with a source IDA associated with said egress point and a destination IDA associated with said access point.

16. The system according to claim 13, wherein said inter-domain address is uniquely identifiable within said first and second communication domains.

17. The system according to claim 13, wherein said communication path supports multimedia communications and said system provides a media independent call control model.

18. The system according to claim 13, wherein said inter-domain address includes a media type and a media domain for each of said egress point and said access point.

* * * * *